(12) United States Patent
Schmisseur

(10) Patent No.: US 10,390,114 B2
(45) Date of Patent: Aug. 20, 2019

(54) MEMORY SHARING FOR PHYSICAL ACCELERATOR RESOURCES IN A DATA CENTER

(71) Applicant: INTEL CORPORATION, Santa Clara, CA (US)

(72) Inventor: Mark A. Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 3 days.

(21) Appl. No.: 15/394,281

(22) Filed: Dec. 29, 2016

(65) Prior Publication Data

US 2018/0024739 A1  Jan. 25, 2018

Related U.S. Application Data

(60) Provisional application No. 62/427,268, filed on Nov. 29, 2016, provisional application No. 62/376,859, (Continued)

(51) Int. Cl.
*G06F 3/06* (2006.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); (Continued)

(58) Field of Classification Search
CPC ...... G06F 3/0613; G06F 3/0655; G06F 3/061; G06F 3/0659; G06F 3/0683; G06F 3/0616; G06F 3/0658; G06F 3/0638; G06F 3/0653; G06F 3/0673; G06F 12/1408; G06F 3/0647; G06F 3/0619; G06F 3/0631; G06F 3/0665; G06F 3/0689
USPC ......................................................... 711/105
See application file for complete search history.

(56) References Cited

U.S. PATENT DOCUMENTS 7,512,728 B2 * 3/2009 Tseng ...................... G06F 13/22
709/236
8,285,927 B2 * 10/2012 Flynn .................... G06F 3/0613
711/113
(Continued)

*Primary Examiner* — Pierre Miche Bataille

(57) ABSTRACT

Examples may include sleds for a rack in a data center including physical accelerator resources and memory for the accelerator resources. The memory can be shared between the accelerator resources. One or more memory controllers can be provided to couple the accelerator resources to the memory to provide memory access to all the accelerator resources. Each accelerator resource can include a memory controller to access a portion of the memory while the accelerator resources can be coupled via an out-of-band channel to provide memory access to the other portions of the memory.

24 Claims, 16 Drawing Sheets

Related U.S. Application Data filed on Aug. 18, 2016, provisional application No. 62/365,969, filed on Jul. 22, 2016.

(51) Int. Cl.

| | | |
|---|---|---|
| H03M 7/40 | (2006.01) | |
| H03M 7/30 | (2006.01) | |
| G06F 16/901 | (2019.01) | |
| G11C 7/10 | (2006.01) | |
| H05K 7/14 | (2006.01) | |
| G06F 1/18 | (2006.01) | |
| G06F 13/40 | (2006.01) | |
| H05K 5/02 | (2006.01) | |
| G08C 17/02 | (2006.01) | |
| H04L 12/24 | (2006.01) | |
| H04L 29/08 | (2006.01) | |
| H04L 12/26 | (2006.01) | |
| H04L 12/851 | (2013.01) | |
| G06F 9/50 | (2006.01) | |
| H04L 12/911 | (2013.01) | |
| G06F 12/109 | (2016.01) | |
| H04L 29/06 | (2006.01) | |
| G11C 14/00 | (2006.01) | |
| G11C 5/02 | (2006.01) | |
| G11C 11/56 | (2006.01) | |
| G02B 6/44 | (2006.01) | |
| G06F 8/65 | (2018.01) | |
| G06F 12/14 | (2006.01) | |
| G06F 13/16 | (2006.01) | |
| H04B 10/25 | (2013.01) | |
| G06F 9/4401 | (2018.01) | |
| G02B 6/38 | (2006.01) | |
| G02B 6/42 | (2006.01) | |
| B25J 15/00 | (2006.01) | |
| B65G 1/04 | (2006.01) | |
| H05K 7/20 | (2006.01) | |
| H04L 12/931 | (2013.01) | |
| H04L 12/939 | (2013.01) | |
| H04W 4/02 | (2018.01) | |
| H04L 12/751 | (2013.01) | |
| G06F 13/42 | (2006.01) | |
| H05K 1/18 | (2006.01) | |
| G05D 23/19 | (2006.01) | |
| G05D 23/20 | (2006.01) | |
| H04L 12/927 | (2013.01) | |
| H05K 1/02 | (2006.01) | |
| H04L 12/781 | (2013.01) | |
| H04Q 1/04 | (2006.01) | |
| G06F 12/0893 | (2016.01) | |
| H05K 13/04 | (2006.01) | |
| G11C 5/06 | (2006.01) | |
| G06F 11/14 | (2006.01) | |
| G06F 11/34 | (2006.01) | |
| G06F 12/0862 | (2016.01) | |
| G06F 15/80 | (2006.01) | |
| H04L 12/919 | (2013.01) | |
| G06F 12/10 | (2016.01) | |
| G06Q 10/06 | (2012.01) | |
| G07C 5/00 | (2006.01) | |
| H04L 12/28 | (2006.01) | |
| H04L 29/12 | (2006.01) | |
| H04L 9/06 | (2006.01) | |
| H04L 9/14 | (2006.01) | |
| H04L 9/32 | (2006.01) | |
| H04L 12/933 | (2013.01) | |
| H04L 12/947 | (2013.01) | |
| H04L 12/811 | (2013.01) | |
| H04W 4/80 | (2018.01) | |
| G06Q 10/08 | (2012.01) | |
| G06Q 10/00 | (2012.01) | |
| G06Q 50/04 | (2012.01) | |

(52) U.S. Cl.
CPC .......... G06F 3/0638 (2013.01); G06F 3/0647 (2013.01); G06F 3/0653 (2013.01); G06F 3/0655 (2013.01); G06F 3/0658 (2013.01); G06F 3/0659 (2013.01); G06F 3/0664 (2013.01); G06F 3/0665 (2013.01); G06F 3/0673 (2013.01); G06F 3/0679 (2013.01); G06F 3/0683 (2013.01); G06F 3/0688 (2013.01); G06F 3/0689 (2013.01); G06F 8/65 (2013.01); G06F 9/4401 (2013.01); G06F 9/505 (2013.01); G06F 9/5016 (2013.01); G06F 9/5044 (2013.01); G06F 9/5072 (2013.01); G06F 9/5077 (2013.01); G06F 11/141 (2013.01); G06F 11/3414 (2013.01); G06F 12/0862 (2013.01); G06F 12/0893 (2013.01); G06F 12/10 (2013.01); G06F 12/109 (2013.01); G06F 12/1408 (2013.01); G06F 13/161 (2013.01); G06F 13/1668 (2013.01); G06F 13/1694 (2013.01); G06F 13/409 (2013.01); G06F 13/4022 (2013.01); G06F 13/4068 (2013.01); G06F 13/42 (2013.01); G06F 13/4282 (2013.01); G06F 15/8061 (2013.01); G06F 16/9014 (2019.01); G06Q 10/06 (2013.01); G06Q 10/06314 (2013.01); G07C 5/008 (2013.01); G08C 17/02 (2013.01); G11C 5/02 (2013.01); G11C 5/06 (2013.01); G11C 7/1072 (2013.01); G11C 11/56 (2013.01); G11C 14/0009 (2013.01); H03M 7/30 (2013.01); H03M 7/3084 (2013.01); H03M 7/3086 (2013.01); H03M 7/40 (2013.01); H03M 7/4031 (2013.01); H03M 7/4056 (2013.01); H03M 7/4081 (2013.01); H03M 7/6005 (2013.01); H03M 7/6023 (2013.01); H04B 10/2504 (2013.01); H04L 9/0643 (2013.01); H04L 9/14 (2013.01); H04L 9/3247 (2013.01); H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/145 (2013.01); H04L 41/147 (2013.01); H04L 43/08 (2013.01); H04L 43/0817 (2013.01); H04L 43/0876 (2013.01); H04L 43/0894 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/00 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L

67/12 (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); G06F 2209/5019 (2013.01); G06F 2209/5022 (2013.01); G06F 2212/1008 (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | |
|---|---|---|---|
| 2014/0237284 A1* | 8/2014 | Fine | G06F 21/00 713/340 |
| 2014/0351811 A1* | 11/2014 | Kruglick | G06F 9/45558 718/1 |
| 2015/0334867 A1* | 11/2015 | Faw | G06F 1/183 211/126.1 |
| 2016/0306667 A1* | 10/2016 | Burger | G06F 9/5011 |

* cited by examiner

Dual-Mode Optical Switching Infrastructure 414

Dual-Mode Optical Switches 415

Sled 404A — Optical Fabric (Ethernet Links, HPC Links) — Dual-Mode Optical Leaf Switch 430 — Dual-Mode Optical Spline Switch 420 — Dual-Mode Optical Leaf Switch 430 — Dual-Mode Optical Spline Switch 420 — Dual-Mode Optical Leaf Switch 430 — Dual-Mode Optical Leaf Switch 430 — Optical Fabric (Ethernet Links, HPC Links) — Sled 404B

MEMORY SHARING FOR PHYSICAL ACCELERATOR RESOURCES IN A DATA CENTER

RELATED CASE

This application claims priority to United States Provisional Patent Application entitled "Framework and Techniques for Pools of Configurable Computing Resources" filed on Nov. 29, 2016 and assigned Ser. No. 62/427,268; United States Provisional Patent Application entitled "Scalable System Framework Prime (SSFP) Omnibus Provisional II" filed on Aug. 18, 2016 and assigned Ser. No. 62/376,859; and United States Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to accelerator resources within a data center.

BACKGROUND

Advancements in networking have enabled the rise in pools of physical resources. A pool of physical resources may be formed from a physical infrastructure including disaggregate physical resources, such as, for example, compute and storage resources found in large data centers. The physical infrastructure can include a number of computing systems having processors, memory, storage, networking, power, cooling, etc. Management entities of these data centers can aggregate a selection of the physical resources to form servers and/or physical computing hosts. These hosts can subsequently be allocated to execute system SW (e.g., OSs, VMMs, or the like) and host containers, VMs, and/or applications.

BRIEF DESCRIPTION OF THE DRAWINGS

FIG. 4 illustrates a data center connectivity scheme.

DETAILED DESCRIPTION

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

As noted, some of the physical resources can be accelerator resources, such as, for example, field-programmable gate arrays adapted to perform various computing operations. The present disclosure provides a set of physical accelerator resources and quantity of computer readable memory shared by the set of physical accelerator resources. This is described in greater detail below. However, first, a general description of a data center in which the accelerator resources with shared memory can be implemented is described. In particular, FIGS. 1 to 10 describe data centers, racks, and sleds according to examples of the present disclosure. FIGS. 11 to 14 describe arrangements of physical accelerator resources and shared memory, according to examples of the present disclosure.

Figure 1:
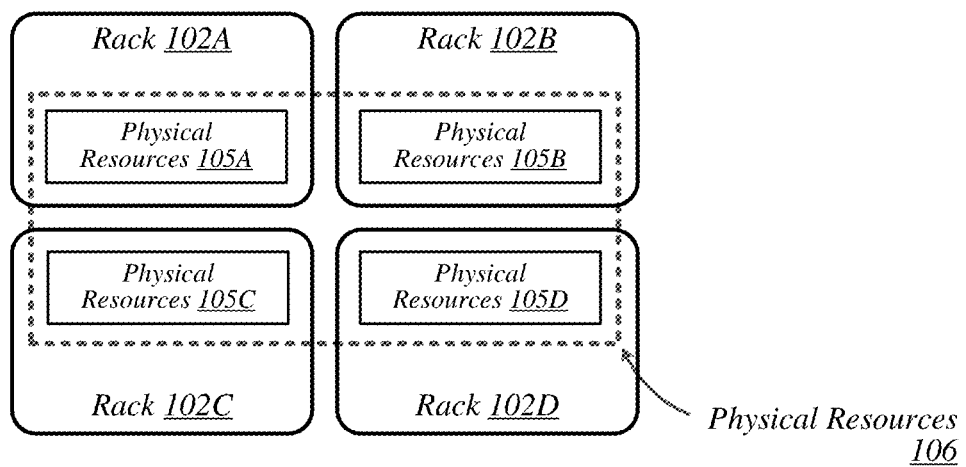
FIG. 1 illustrates a first example data center.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, field programmable gate arrays (FPGAs), application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in some embodiments, the racks 102A to 102D include integrated power sources that receive a greater voltage than is typical for power sources. The increased voltage enables the power sources to provide additional power to the components on each sled, enabling the components to operate at higher than typical frequencies.

Figure 2:
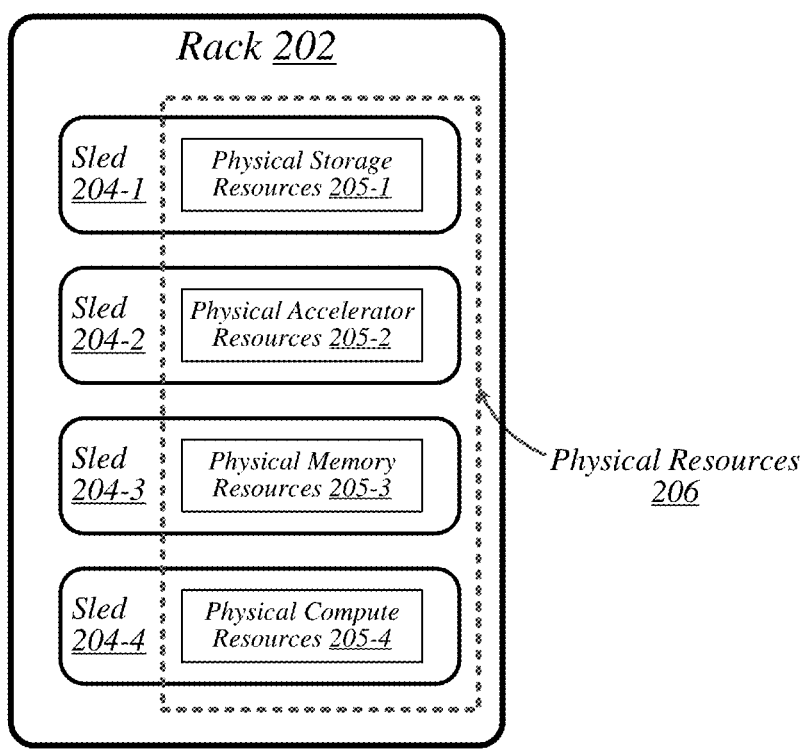
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of each of the various types of physical resources (e.g., compute, memory, accelerator, storage). By having robotically accessible and robotically-manipulatable sleds comprising disaggregated resources, each type of resource can be upgraded independently of each other and at their own optimized refresh rate.

Groups of the physical accelerator resources 205-2 can share memory, as described in greater detail below, for example, with reference to FIGS. 11-14. Furthermore, it is noted, the number of sleds 204-1 to 204-4 and the arrangement (e.g., column, row, etc.) is depicted at a quantity and in an arrangement to facilitate understanding. However, examples are not limited in these contexts.

Figure 3:
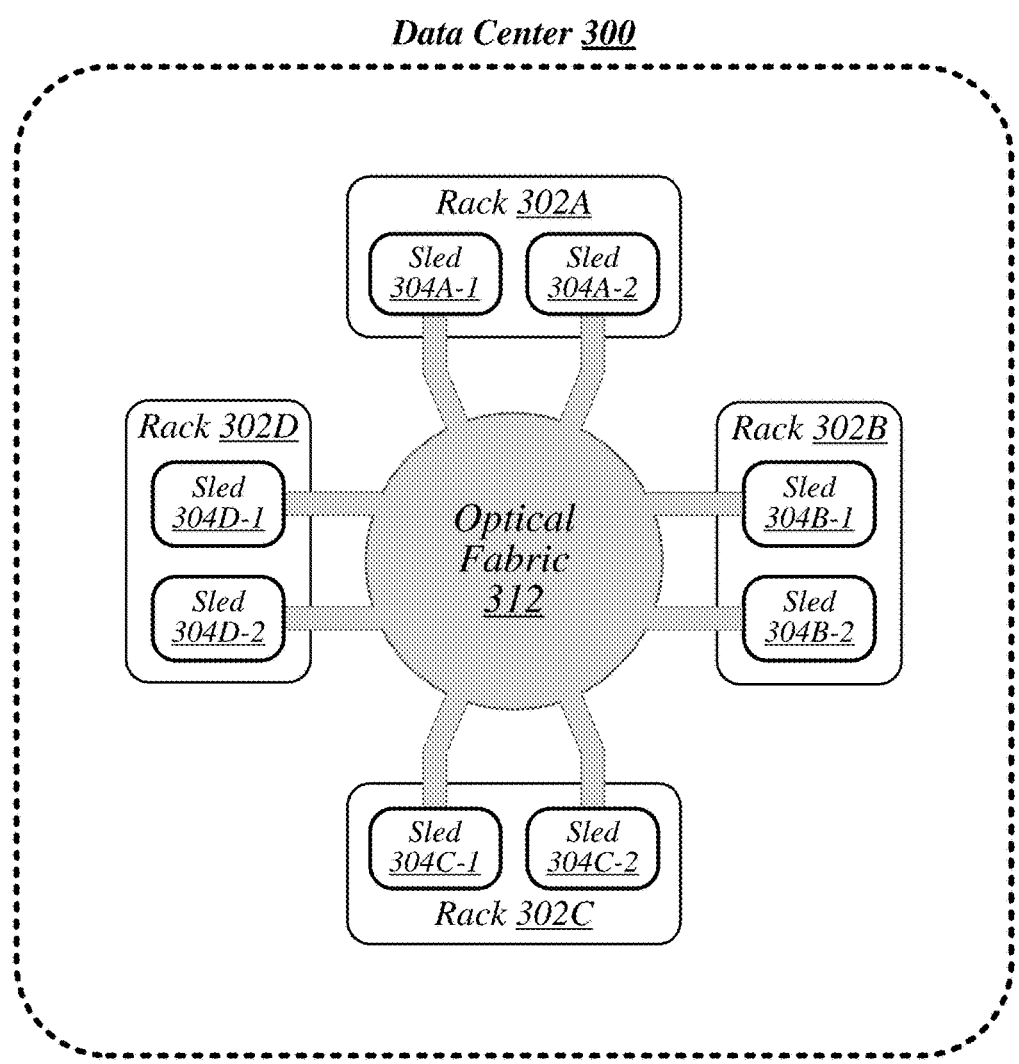
FIG. 3 illustrates a second example data center.

FIG. 3 illustrates an example of a data center 300 that may generally be representative of one in/for which one or more techniques described herein may be implemented according to various embodiments. As shown in this figure, data center 300 may feature an optical fabric 312. Optical fabric 312 may generally comprise a combination of optical signaling media (such as optical cabling) and optical switching infrastructure via which any particular sled in data center 300 can send signals to (and receive signals from) each of the other sleds in data center 300. The signaling connectivity that optical fabric 312 provides to any given sled may include connectivity both to other sleds in a same rack and sleds in other racks.

In the particular non-limiting example depicted here, data center 300 includes four racks 302A to 302D. Racks 302A to 302D house respective pairs of sleds 304A-1 and 304A-2, 304B-1 and 304B-2, 304C-1 and 304C-2, and 304D-1 and 304D-2. Thus, in this example, data center 300 comprises a total of eight sleds. Via optical fabric 312, each such sled may possess signaling connectivity with each of the seven other sleds in data center 300. For example, via optical fabric 312, sled 304A-1 in rack 302A may possess signaling connectivity with sled 304A-2 in rack 302A, as well as the six other sleds 304B-1, 304B-2, 304C-1, 304C-2, 304D-1, and 304D-2 that are distributed among the other racks 302B, 302C, and 302D of data center 300.

FIG. 4 illustrates an overview of a connectivity scheme 400 that may generally be representative of link-layer connectivity that may be established in some embodiments among the various sleds of a data center, such as any of example data centers 100 and 300 of FIGS. 1 and 3. Connectivity scheme 400 may be implemented using an optical fabric that features a dual-mode optical switching infrastructure 414. Dual-mode optical switching infrastructure 414 may generally comprise a switching infrastructure that is capable of receiving communications according to multiple link-layer protocols via a same unified set of optical signaling media, and properly switching such communications. In various embodiments, dual-mode optical switching infrastructure 414 may be implemented using one or more dual-mode optical switches 415. In various embodiments, dual-mode optical switches 415 may generally comprise high-radix switches. In some embodiments, dual-mode optical switches 415 may comprise multi-ply switches, such as four-ply switches. In various embodiments, dual-mode optical switches 415 may feature integrated silicon photonics that enable them to switch communications with significantly reduced latency in comparison to conventional switching devices. In some embodiments, dual-mode optical switches 415 may constitute leaf switches 430 in a leaf-spine architecture additionally including one or more dual-mode optical spine switches 420.

In various embodiments, dual-mode optical switches may be capable of receiving both Ethernet protocol communications carrying Internet Protocol (IP packets) and communications according to a second, high-performance computing (HPC) link-layer protocol (e.g., Omni-Path Architecture, Infiniband, or the like) via optical signaling media of an optical fabric. As reflected in this figure, with respect to any particular pair of sleds 404A and 404B possessing optical signaling connectivity to the optical fabric, connectivity scheme 400 may thus provide support for link-layer connectivity via both Ethernet links and HPC links. Thus, both Ethernet and HPC communications can be supported by a single high-bandwidth, low-latency switch fabric. The embodiments are not limited to this example.

Figure 5:
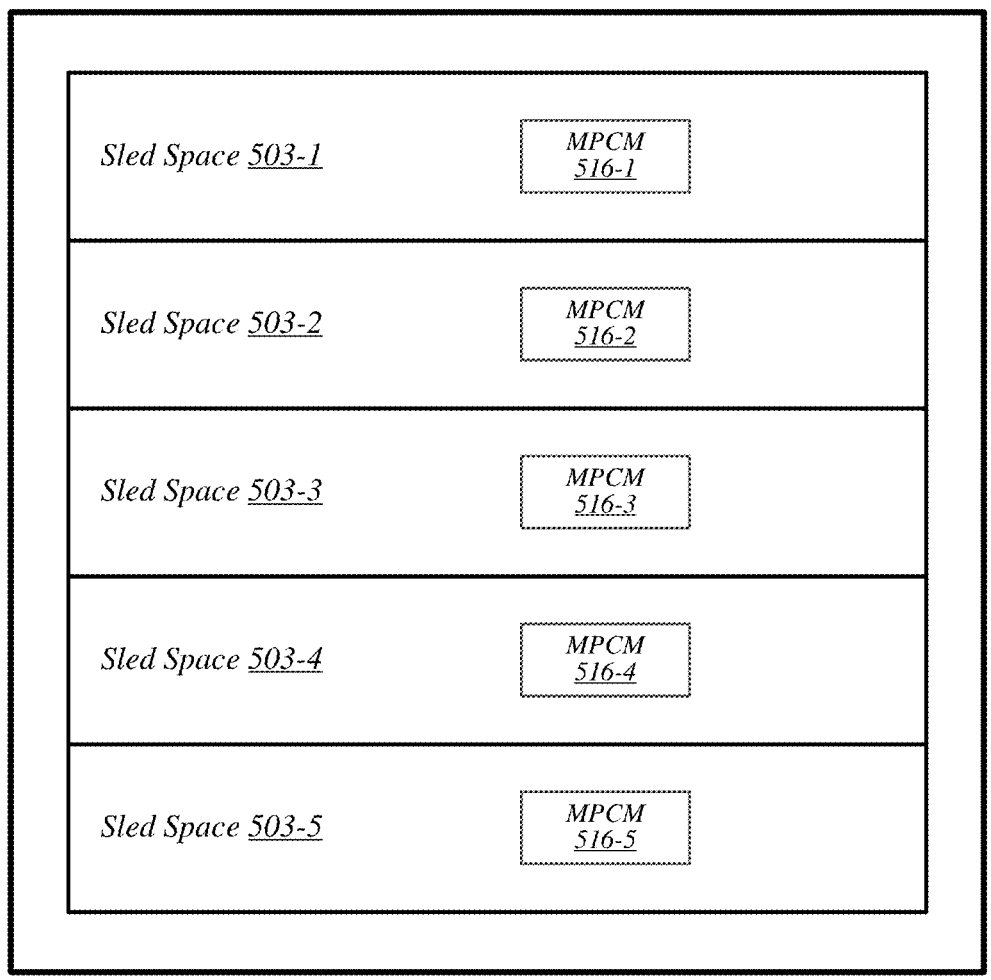
FIG. 5 illustrates a second example rack.

FIG. 5 illustrates a general overview of a rack architecture 500 that may be representative of an architecture of any particular one of the racks depicted herein. As reflected in this figure, rack architecture 500 may generally feature a plurality of sled spaces (or sled bays) into which sleds may be inserted, each of which may be robotically-accessible via a rack access region 501. In this particular non-limiting example, rack architecture 500 features five sled spaces 503-1 to 503-5. Sled spaces 503-1 to 503-5 feature respective multi-purpose connector modules (MPCMs) 516-1 to 516-5. When a sled is inserted into any given one of sled spaces 503-1 to 503-5, the corresponding MPCM may couple with a counterpart MPCM of the inserted sled. This coupling may provide the inserted sled with connectivity to both signaling infrastructure and power infrastructure of the rack in which it is housed.

Figure 6:
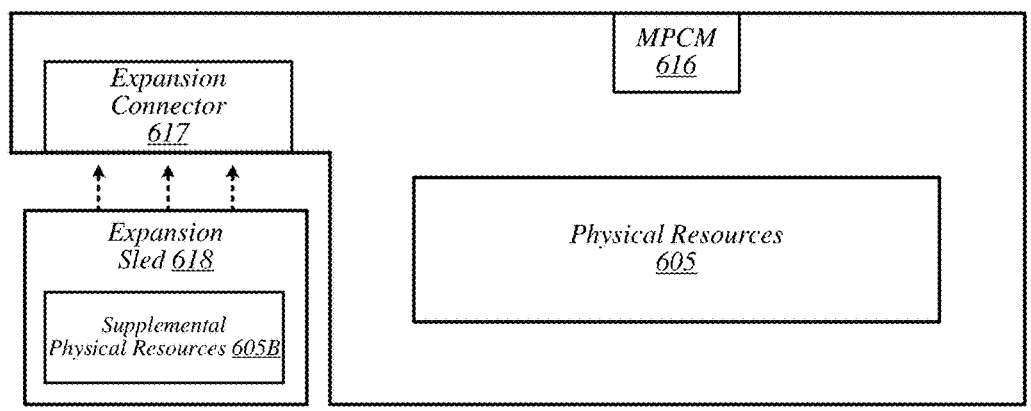
FIG. 6 illustrates a first example sled.

Included among the types of sleds to be accommodated by rack architecture 500 may be one or more types of sleds that feature expansion capabilities. FIG. 6 illustrates an example of a sled 604 that may be representative of a sled of such a type. As shown in this figure, sled 604 may comprise a set of physical resources 605, as well as an MPCM 616 designed to couple with a counterpart MPCM when sled 604 is inserted into a sled space such as any of sled spaces 503-1 to 503-5 of FIG. 5.

Sled 604 may also feature an expansion connector 617. Expansion connector 617 may generally comprise a socket, slot, or other type of connection element that is capable of accepting one or more types of expansion modules, such as an expansion sled 618. By coupling with a counterpart connector on expansion sled 618, expansion connector 617 may provide physical resources 605 with access to supplemental computing resources 605B residing on expansion sled 618. The embodiments are not limited in this context. In some examples, expansion sled 618 can comprise physical accelerator resources (e.g., comprising FPGAs, GPUs, memory, or a combination of FPGAs, GPUs, and memory.

Figure 7:
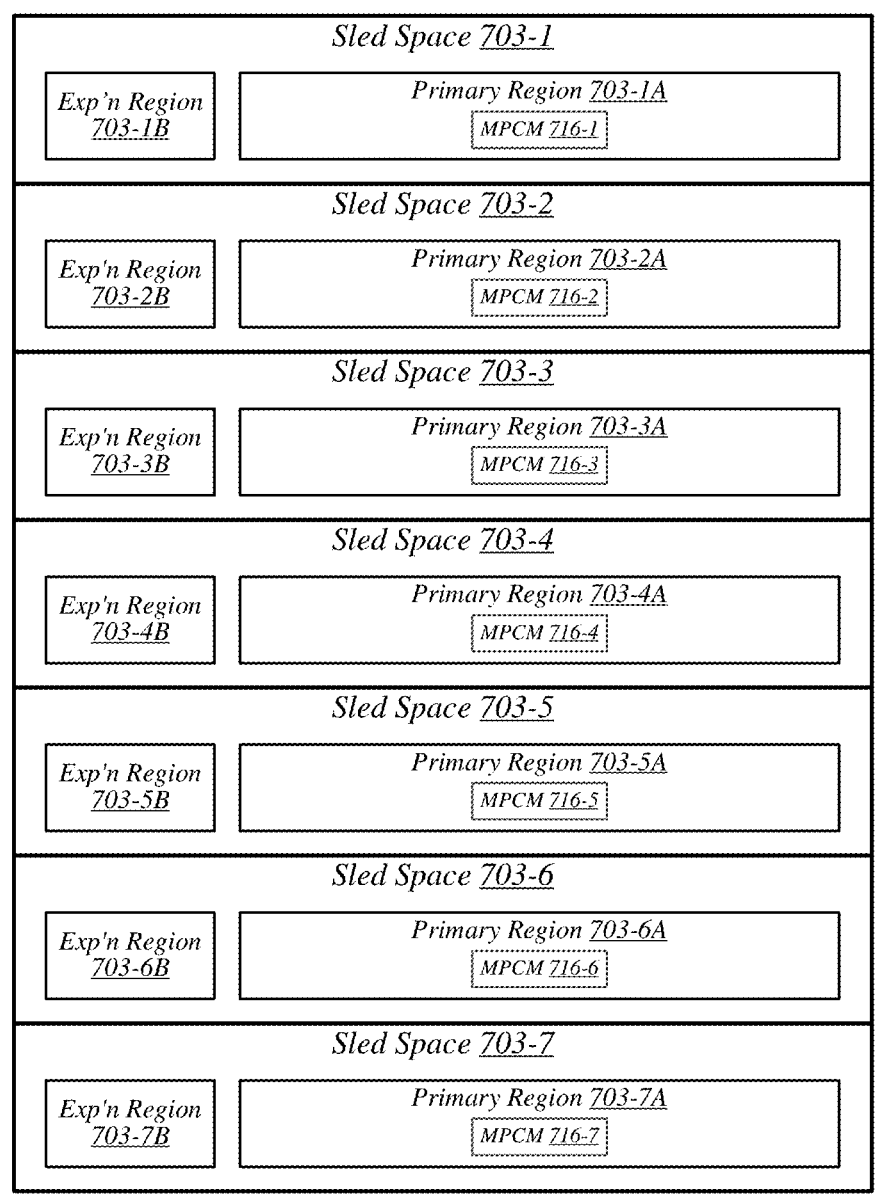
FIG. 7 illustrates a third example rack.

FIG. 7 illustrates an example of a rack architecture 700 that may be representative of a rack architecture that may be implemented in order to provide support for sleds featuring expansion capabilities, such as sled 604 of FIG. 6. In the particular non-limiting example depicted in FIG. 7, rack architecture 700 includes seven sled spaces 703-1 to 703-7, which feature respective MPCMs 716-1 to 716-7. Sled spaces 703-1 to 703-7 include respective primary regions 703-1A to 703-7A and respective expansion regions 703-1B to 703-7B.

With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 618 of FIG. 6, in the event that the inserted sled is configured with such a module.

Figure 8:
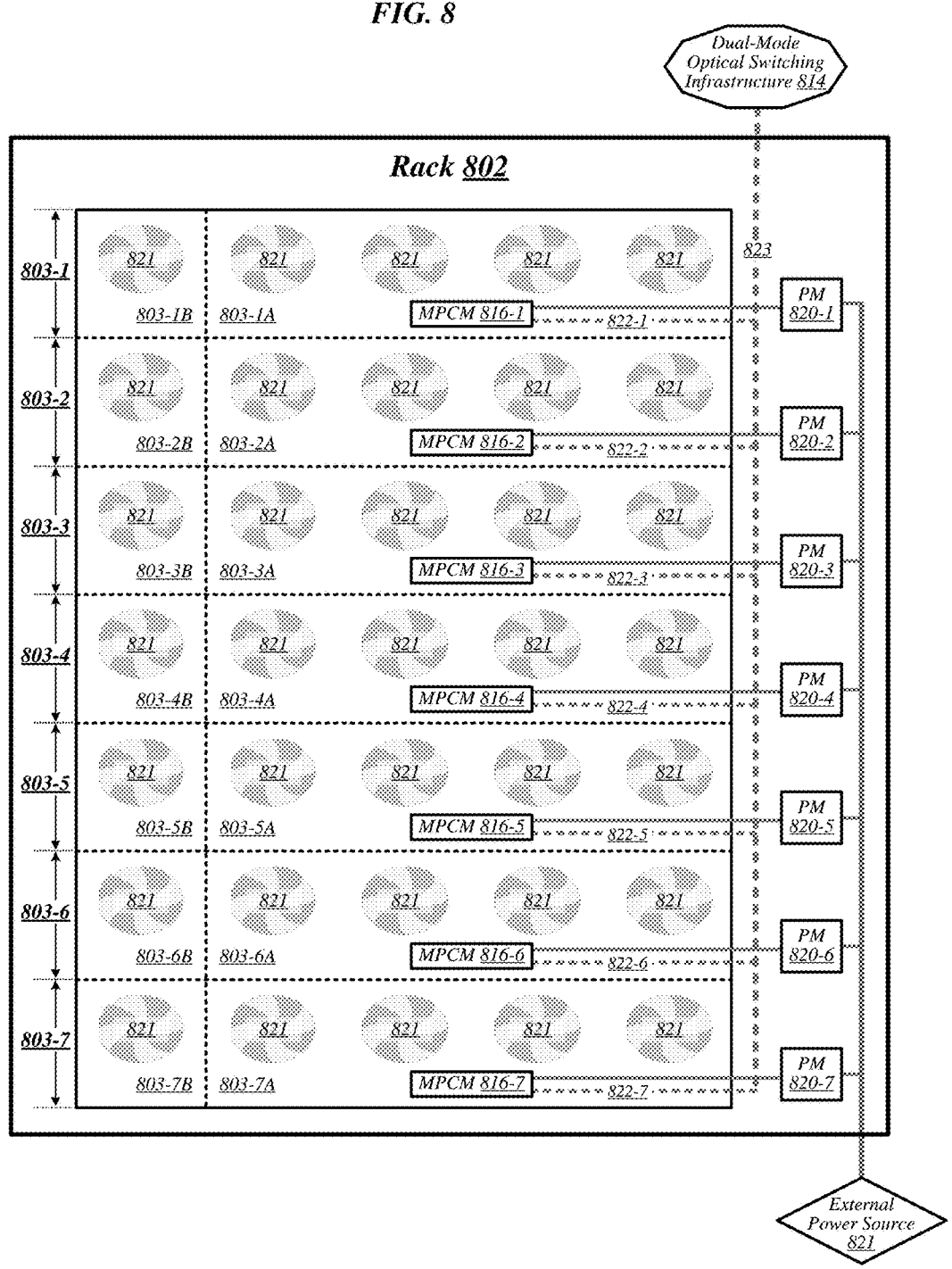
FIG. 8 illustrates a fourth example rack.

FIG. 8 illustrates an example of a rack 802 that may be representative of a rack implemented according to rack architecture 700 of FIG. 7 according to some embodiments. In the particular non-limiting example depicted in FIG. 8, rack 802 features seven sled spaces 803-1 to 803-7, which include respective primary regions 803-1A to 803-7A and respective expansion regions 803-1B to 803-7B. In various embodiments, temperature control in rack 802 may be implemented using an air cooling system. For example, as reflected in FIG. 8, rack 802 may feature a plurality of fans 819 that are generally arranged to provide air cooling within the various sled spaces 803-1 to 803-7. In some embodiments, the height of the sled space is greater than the conventional "1 U" server height. In such embodiments, fans 819 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 816-1 to 816-7 may be configured to provide inserted sleds with access to power sourced by respective power modules 820-1 to 820-7, each of which may draw power from an external power source 821. In various embodiments, external power source 821 may deliver alternating current (AC) power to rack 802, and power modules 820-1 to 820-7 may be configured to convert such AC power to direct current (DC) power to be sourced to inserted sleds. In some embodiments, for example, power modules 820-1 to 820-7 may be configured to convert 277-volt AC power into 12-volt DC power for provision to inserted sleds via respective MPCMs 816-1 to 816-7. The embodiments are not limited to this example.

MPCMs 816-1 to 816-7 may also be arranged to provide inserted sleds with optical signaling connectivity to a dual-mode optical switching infrastructure 814, which may be the same as—or similar to—dual-mode optical switching infrastructure 414 of FIG. 4. In various embodiments, optical connectors contained in MPCMs 816-1 to 816-7 may be designed to couple with counterpart optical connectors contained in MPCMs of inserted sleds to provide such sleds with optical signaling connectivity to dual-mode optical switching infrastructure 814 via respective lengths of optical cabling 822-1 to 822-7. In some embodiments, each such length of optical cabling may extend from its corresponding MPCM to an optical interconnect loom 823 that is external to the sled spaces of rack 802. In various embodiments, optical interconnect loom 823 may be arranged to pass through a support post or other type of load-bearing element of rack 802. Because inserted sleds connect to an optical switching infrastructure via MPCMs, the resources typically spent in manually configuring the rack cabling to accommodate a newly inserted sled can be saved.

Figure 9:
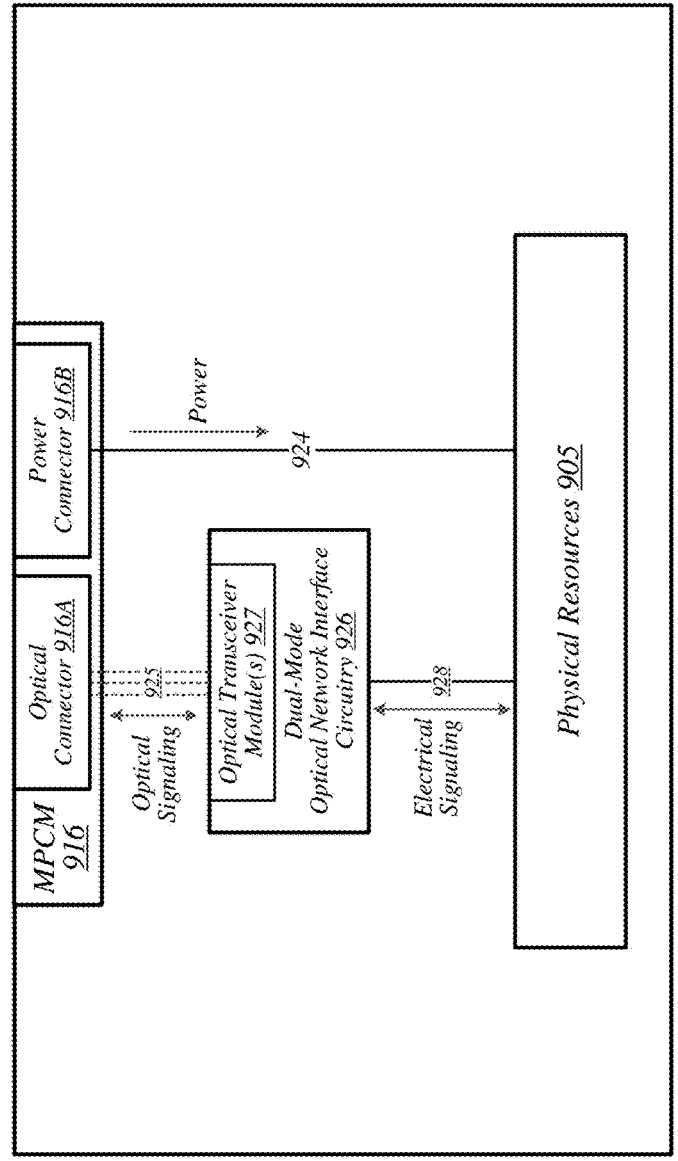
FIG. 9 illustrates a second example sled.

FIG. 9 illustrates an example of a sled 904 that may be representative of a sled designed for use in conjunction with rack 802 of FIG. 8 according to some embodiments. Sled 904 may feature an MPCM 916 that comprises an optical connector 916A and a power connector 916B, and that is designed to couple with a counterpart MPCM of a sled space in conjunction with insertion of MPCM 916 into that sled space. Coupling MPCM 916 with such a counterpart MPCM may cause power connector 916 to couple with a power connector comprised in the counterpart MPCM. This may generally enable physical resources 905 of sled 904 to source power from an external source, via power connector 916 and power transmission media 924 that conductively couples power connector 916 to physical resources 905.

Sled 904 may also include dual-mode optical network interface circuitry 926. Dual-mode optical network interface circuitry 926 may generally comprise circuitry that is capable of communicating over optical signaling media according to each of multiple link-layer protocols supported by dual-mode optical switching infrastructure 814 of FIG. 8. In some embodiments, dual-mode optical network interface circuitry 926 may be capable both of Ethernet protocol communications and of communications according to a second, high-performance protocol that offers significantly greater throughput and significantly reduced latency relative to Ethernet. In various embodiments, dual-mode optical network interface circuitry 926 may include one or more optical transceiver modules 927, each of which may be capable of transmitting and receiving optical signals over each of one or more optical channels. The embodiments are not limited in this context.

Coupling MPCM 916 with a counterpart MPCM of a sled space in a given rack may cause optical connector 916A to couple with an optical connector comprised in the counterpart MPCM. This may generally establish optical connectivity between optical cabling of the sled and dual-mode optical network interface circuitry 926, via each of a set of optical channels 925. Dual-mode optical network interface circuitry 926 may communicate with the physical resources 905 of sled 904 via electrical signaling media 928. In addition to the dimensions of the sleds and arrangement of components on the sleds to provide improved cooling and enable operation at a relatively higher thermal envelope (e.g., 250 W), as described above with reference to FIG. 8, in some embodiments, a sled may include one or more additional features to facilitate air cooling, such as a heat pipe and/or heat sinks arranged to dissipate heat generated by physical resources 905. It is worthy of note that although the example sled 904 depicted in FIG. 9 does not feature an expansion connector, any given sled that features the design elements of sled 904 may also feature an expansion connector according to some embodiments.

Figure 10:
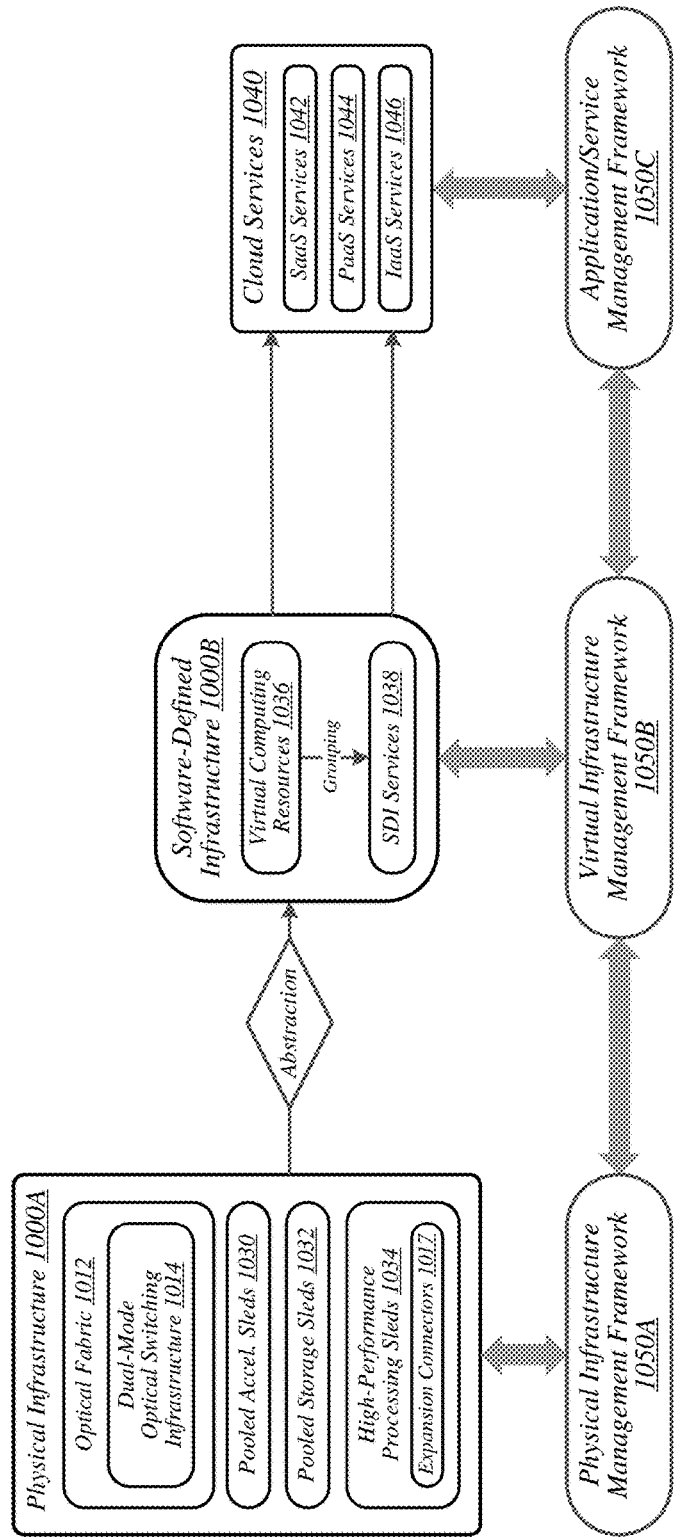
FIG. 10 illustrates a third example data center.

FIG. 10 illustrates an example of a data center 1000 that may generally be representative of one in/for which one or more techniques described herein may be implemented according to various embodiments. As reflected in this figure, a physical infrastructure management framework 1050A may be implemented to facilitate management of a physical infrastructure 1000A of data center 1000. In various embodiments, one function of physical infrastructure management framework 1050A may be to manage automated maintenance functions within data center 1000, such as the use of robotic maintenance equipment to service computing equipment within physical infrastructure 1000A. In some embodiments, physical infrastructure 1000A may feature an advanced telemetry system that performs telemetry reporting that is sufficiently robust to support remote automated management of physical infrastructure 1000A. In various embodiments, telemetry information provided by such an advanced telemetry system may support features such as failure prediction/prevention capabilities and capacity planning capabilities. In some embodiments, physical infrastructure management framework 1050A may also be configured to manage authentication of physical infrastructure components using hardware attestation techniques. For example, robots may verify the authenticity of components before installation by analyzing information collected from a radio frequency identification (RFID) tag associated with each component to be installed.

As depicted, the physical infrastructure 1000A of data center 1000 may comprise an optical fabric 1012, which may include a dual-mode optical switching infrastructure 1014. Optical fabric 1012 and dual-mode optical switching infrastructure 1014 may be the same as—or similar to—optical fabric 312 of FIG. 3 and dual-mode optical switching infrastructure 414 of FIG. 4, respectively, and may provide high-bandwidth, low-latency, multi-protocol connectivity among sleds of data center 1000. As discussed above, with reference to FIG. 1, in various embodiments, the availability of such connectivity may make it feasible to disaggregate and dynamically pool resources such as processors, accelerators, memory, and storage. In some embodiments, for example, one or more pooled accelerator sleds 1030 may be included among the physical infrastructure 1000A of data center 1000, each of which may comprise a pool of accelerator resources—such as co-processors and/or FPGAs, for example—that is available globally accessible to other sleds via optical fabric 1012 and dual-mode optical switching infrastructure 1014.

In another example, in various embodiments, one or more pooled storage sleds 1032 may be included among the physical infrastructure 1000A of data center 1000, each of which may comprise a pool of storage resources that is available globally accessible to other sleds via optical fabric 1012 and dual-mode optical switching infrastructure 1014. In some embodiments, such pooled storage sleds 1032 may comprise pools of solid-state storage devices such as solid-state drives (SSDs). In various embodiments, one or more high-performance processing sleds 1034 may be included among the physical infrastructure 1000A of data center 1000. In some embodiments, high-performance processing sleds 1034 may comprise pools of high-performance processors, as well as cooling features that enhance air cooling to yield a higher thermal envelope of up to 250 W or more. In various embodiments, any given high-performance processing sled 1034 may feature an expansion connector 1017 that can accept a far memory expansion sled, such that the far memory that is locally available to that high-performance processing sled 1034 is disaggregated from the processors and near memory comprised on that sled. In some embodiments, such a high-performance processing sled 1034 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 4. The embodiments are not limited in this context.

In various embodiments, one or more layers of abstraction may be applied to the physical resources of physical infrastructure 1000A in order to define a virtual infrastructure, such as a software-defined infrastructure 1000B. In some embodiments, virtual computing resources 1036 of software-defined infrastructure 1000B may be allocated to support the provision of cloud services 1040. In various embodiments, particular sets of virtual computing resources 1036 may be grouped for provision to cloud services 1040 in the form of SDI services 1038. Examples of cloud services 1040 may include—without limitation—software as a service (SaaS) services 1042, platform as a service (PaaS) services 1044, and infrastructure as a service (IaaS) services 1046.

In some embodiments, management of software-defined infrastructure 1000B may be conducted using a virtual infrastructure management framework 1050B. In various embodiments, virtual infrastructure management framework 1050B may be designed to implement workload fingerprinting techniques and/or machine-learning techniques in conjunction with managing allocation of virtual computing resources 1036 and/or SDI services 1038 to cloud services 1040. In some embodiments, virtual infrastructure management framework 1050B may use/consult telemetry data in conjunction with performing such resource allocation. In various embodiments, an application/service management framework 1050C may be implemented in order to provide quality of service (QoS) management capabilities for cloud services 1040.

In particular, the virtual infrastructure management framework 1050B can compose virtual computing platforms (sometimes referred to as virtual computing devices) from elements of physical infrastructure 1000A. Furthermore, with some examples, ones of pooled accelerator sleds 1030 can be dynamically allocated to such virtual computing platforms, for example, to support various ones of could services 1040. The embodiments are not limited in this context.

Figure 11:
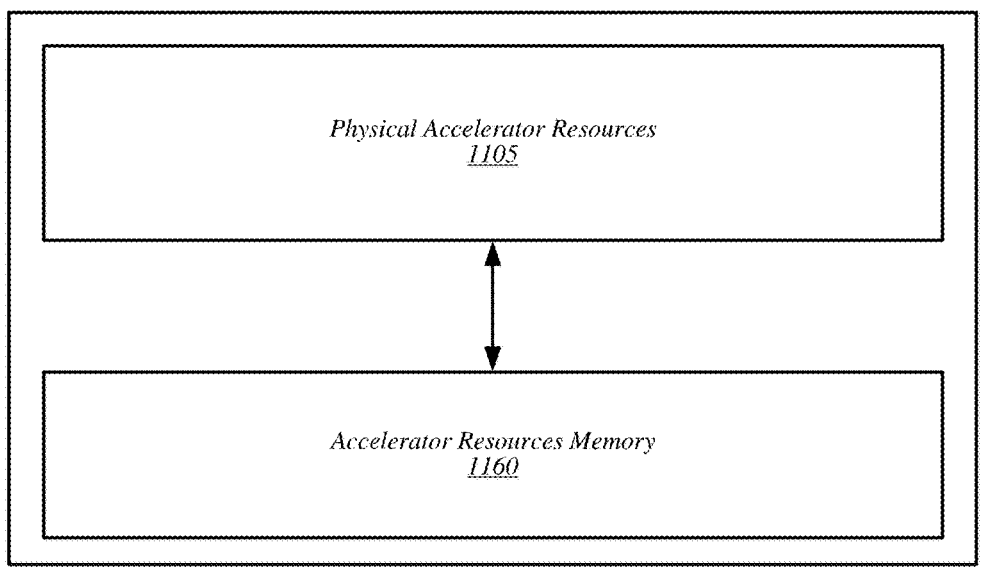
FIG. 11 illustrates a third example sled.

FIG. 11 illustrates an example sled 1104. As depicted, the example sled 1104 includes physical accelerator resources 1105 and accelerator resource memory 1160. In general, the accelerator resource memory 1160 can be any of a variety of computer readable memories. For example, accelerator resource memory 1160 can be random-access memory (RAM), dynamic RAM (DRAM), synchronous DRAM (SDRAM), double-data rate SDRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

The accelerator resource memory 1160 can be communicatively and/or operably coupled to the accelerator resources 1105 in a manner that the physical accelerator resources 1105 can share the memory. More specifically, the physical accelerator resources can utilize (e.g., read, write, or the like) the memory in a shared manner.

Figure 12:
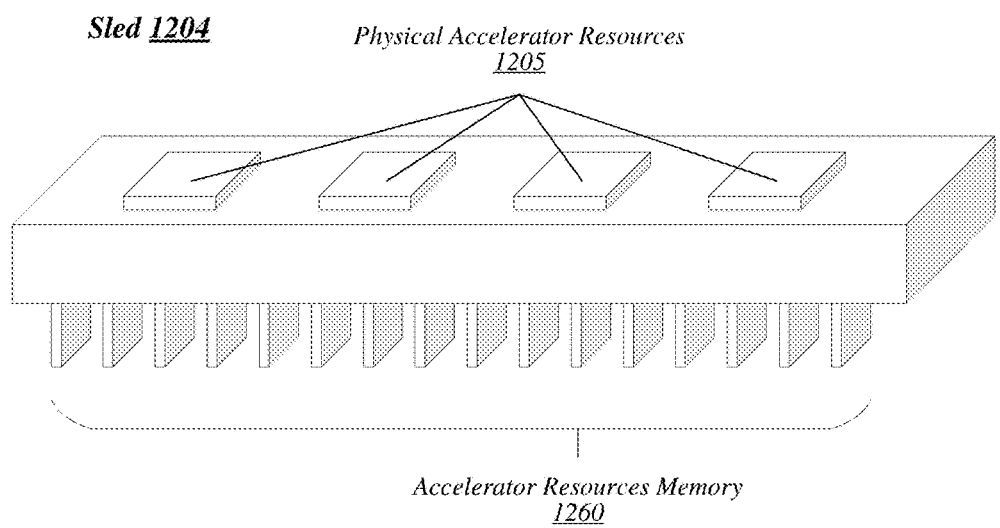
FIG. 12 illustrates a fourth example sled.

FIG. 12 illustrates a perspective view of an example sled 1204. The example sled 1204 includes physical accelerator resources 1205 and accelerator resource memory 1260. As illustrated, the physical accelerator resources 1205 can be disposed on a first side (e.g., upper surface in this example) while the accelerator resource memory 1260 can be disposed on a second, opposite, side (e.g., lower surface in this example) of the sled 1204.

More specifically, various physical accelerator resources (e.g., field-programmable gate array packages, or the like) can be disposed on the upper surface of the sled 1204. Additionally, various physical memory resources (e.g., dual in-line memory modules (DIMMs), or the like) can be disposed on the lower surface of sled 1204. The sled 1204 can further comprise (not shown) circuit boards and/or connective components to provide connectivity between the physical accelerator resource packages, the memory DIMMs, and other interconnects on the sled 1204 (e.g., optical interconnects, or the like).

Figure 13:
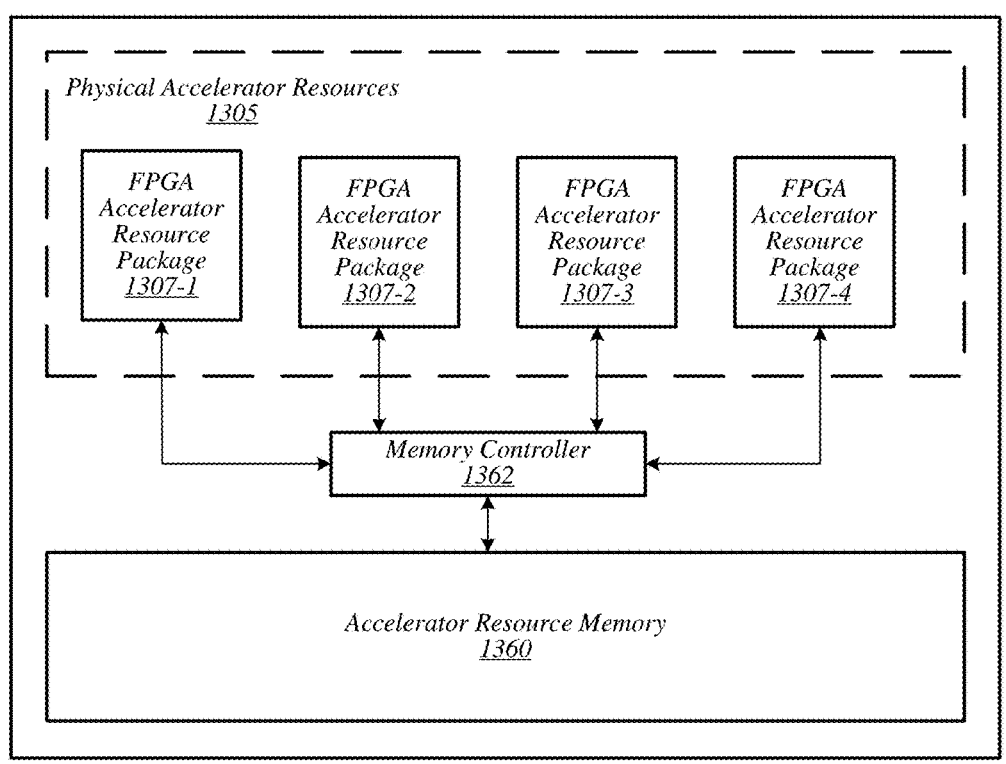
FIG. 13 illustrates a fifth example sled.

FIG. 13 illustrates an example sled 1304, arranged according to of the present disclosure. In particular, this figure depicts a sled 1304 having physical accelerator resources 1305, a bank of accelerator resource memory 1360 and a memory controller 1362. Physical accelerator resources 1305 are depicted including FPGA accelerator resource packages 1307-1, 1307-2, 1307-3 and 1307-4. FPGA packages 1307-1 to 1307-4 are coupled to memory controller 1362 while memory controller 1362 is coupled to accelerator resource memory 1360. Accelerator resource memory 1360 can be a bank (e.g., set of memory DIMMs, or the like) of memory. Accordingly, during operation, FPGA packages 1307-1 to 1307-4 can operate to access (e.g., read, write, or the like) memory addresses within in accelerator resource memory 1360 via memory controller 1362. It is noted, that the number of accelerator resource packages is depicted at a quantity to facilitate understanding and not to be limiting.

Figure 14:
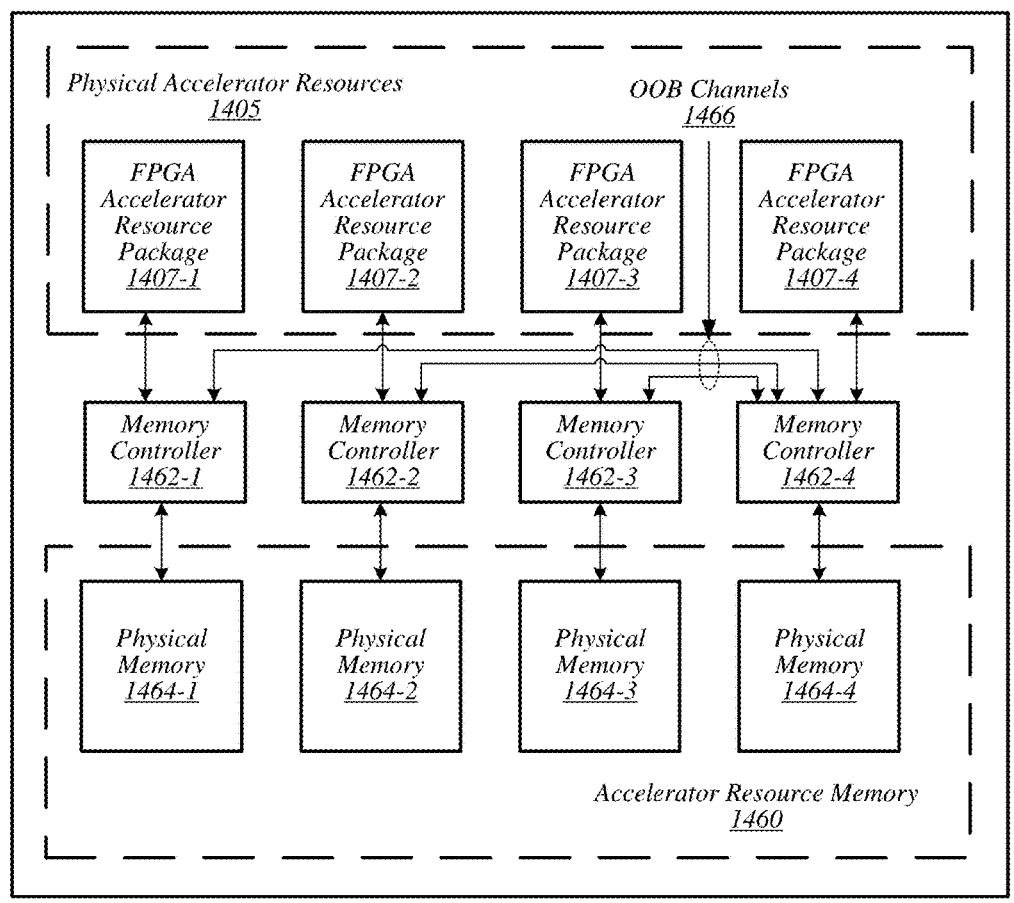
FIG. 14 illustrates a sixth example sled.

FIG. 14 illustrates an example sled 1404, arranged according to of the present disclosure. In particular, this figure depicts a sled 1404 having physical accelerator resources 1405, a bank of accelerator resource memory 1460 and a memory controller 1462 for each physical accelerator resource. More specifically, physical accelerator resources 1405 include FPGA accelerator resource packages 1407-1, 1407-2, 1407-3 and 1407-4. Accordingly, a memory controller for each of the four (4) FPGA accelerator resource packages 1407-1 to 1407-4 is provided. That is, memory controllers 1462-1, 1462-2, 1462-3 and 1462-4 are depicted. FPGA accelerator resource packages 1407-1 to 1407-4 are coupled to memory controllers 1462-1 to 1462-4, respectively. It is noted, that in some instances, memory controllers 1462-1 to 1462-4 can be implemented in (refer to FIG. 15) respective ones of the FPGA accelerator resource packages 1407-1 to 1407-4. Memory controllers 1462-1 to 1462-4 operate to facilitate access (e.g., read, write, or the like) to memory addresses within accelerator resource memory 1460.

The bank of accelerator resource memory 1460 can include a number of sets or groups of accelerator resource memory. For example, the accelerator resource memory can include a set of accelerator resource memory allocated to each of the FPGA accelerator resource packages 1407-1 to 1407-4. For example, accelerator resource memory 1460 is depicted including physical memory 1464-1, 1464-2, 1464-3 and 1464-4. Physical memory 1464-1 to 1464-4 is operably coupled to a respective FPGA accelerator resource package 1407-1 to 1407-4 via a respective memory controller 1462-1 to 1462-4. For example, FPGA accelerator resource package 1407-1 is coupled to physical memory 1464-1 via memory controller 1462-1.

Additionally, FPGA accelerator resource packages 1407-1 to 1407-4 and/or memory controllers 1462-1 to 1462-4 can be interconnected via an out-of-band (OOB) channel. In some examples, the OOB channel can be a communication interface bus, such as, for example, a PCIe bus, a proprietary interconnect bus, or the like. It is noted, that for purposes of clarity, OOB channels 1466 are depicted between memory controller 1462-4 and the other memory controllers (e.g., 1462-3, 1462-2, and 1462-1). However, embodiments can provide OOB channels 1466 to couple other ones of the memory controllers 1462 (refer to FIG. 15). Ones of the FPGA accelerator resource packages 1407-1 to 1407-4 can access any one of the physical memories 1464-1 to 1464-4 via either a directly attached (or integrated) memory controller 1462-1 to 1462-4 or via the OOB channels 1466.

Figure 15:
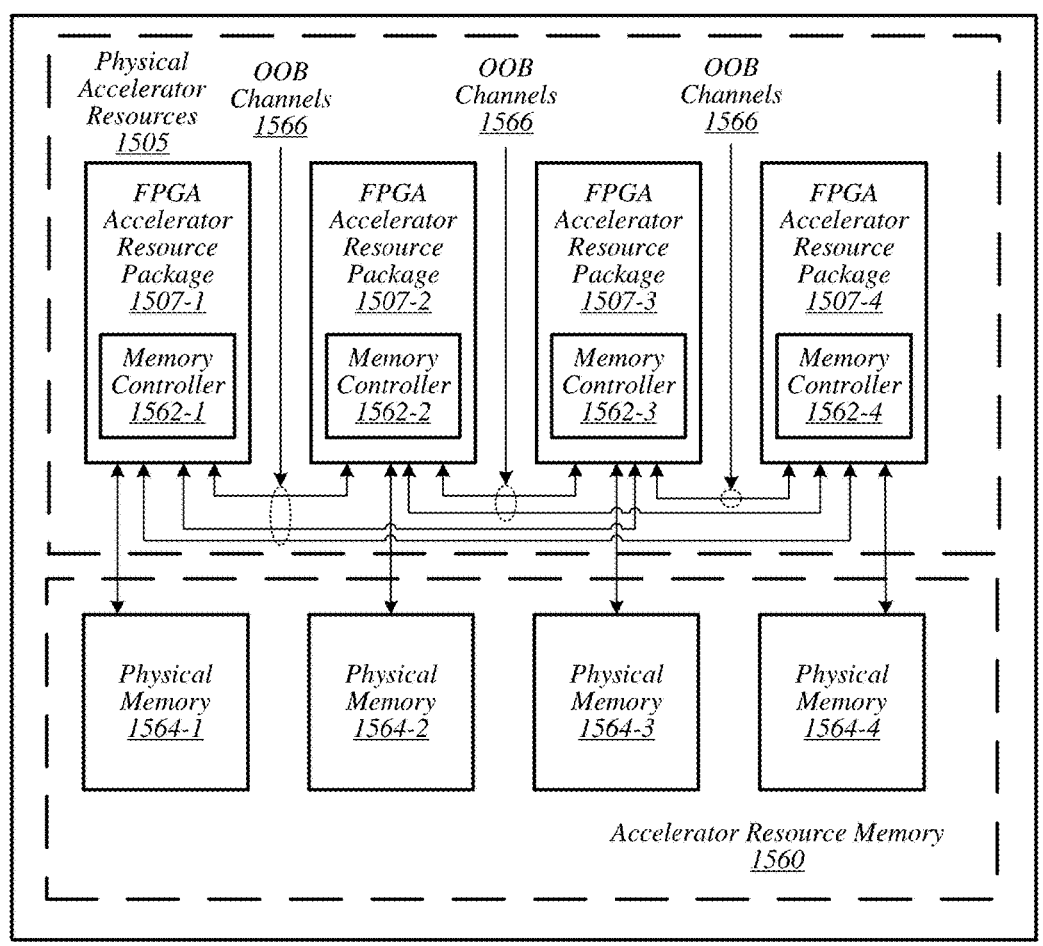
FIG. 15 illustrates a seventh example sled.

FIG. 15 illustrates an example sled 1504, arranged according to of the present disclosure. In particular, this figure depicts a sled 1504 having physical accelerator resources 1505, a bank of accelerator resource memory 1560 and a memory controller 1562 for each physical accelerator resource. More specifically, physical accelerator resources 1505 include FPGA accelerator resource packages 1507-1, 1507-2, 1507-3 and 1507-4. Additionally, FPGA accelerator resource packages can include integrated memory controllers. That is, memory controllers 1562-1, 1562-2, 1562-3 and 1562-4 are depicted integrated into respective ones of the FPGA accelerator resource packages 1507-1 to 1507-4. Memory controllers 1562-1 to 1562-4 operate to facilitate access (e.g., read, write, or the like) to memory addresses within accelerator resource memory 1560.

The bank of accelerator resource memory 1560 can include a number of sets or groups of accelerator resource memory. For example, the accelerator resource memory can include a set of accelerator resource memory allocated to each of the FPGA accelerator resource packages 1507-1 to 1507-4. For example, accelerator resource memory 1560 is depicted including physical memory 1564-1, 1564-2, 1564-3 and 1564-4. In this illustrative example, physical memory 1564-1 to 1564-4 is operably coupled to a respective FPGA accelerator resource package 1507-1 to 1507-4. For example, FPGA accelerator resource package 1507-1 is coupled to physical memory 1564-1.

Additionally, FPGA accelerator resource packages 1507-1 to 1507-4 can be interconnected via an out-of-band (OOB) channels 1566. In some examples, the OOB channels 1566 can be a communication interface bus, such as, for example, a PCIe bus, a proprietary interconnect bus, or the like. In this illustrative example, FPGA accelerator resource packages 1507-1 to 1507-4 are interconnected via separate ones of OOB channels 1566. Thus, this illustrative example can be implemented where each FPGA accelerator resources packages 1507-1 to 1507-4 includes at least 3 OOB channel connections (e.g., PCIe interconnect, proprietary interconnect, or the like). Thus, FPGA accelerator resource packages 1507-1 to 1507-4 can access any one of the physical memories 1564-1 to 1564-4 via either a directly attached memory or via the OOB channels 1566. In some examples, OOB channels 1566 could be implemented in a ring topology (versus a fully interconnected topology as shown). Examples are not limited in this context.

Figure 16:
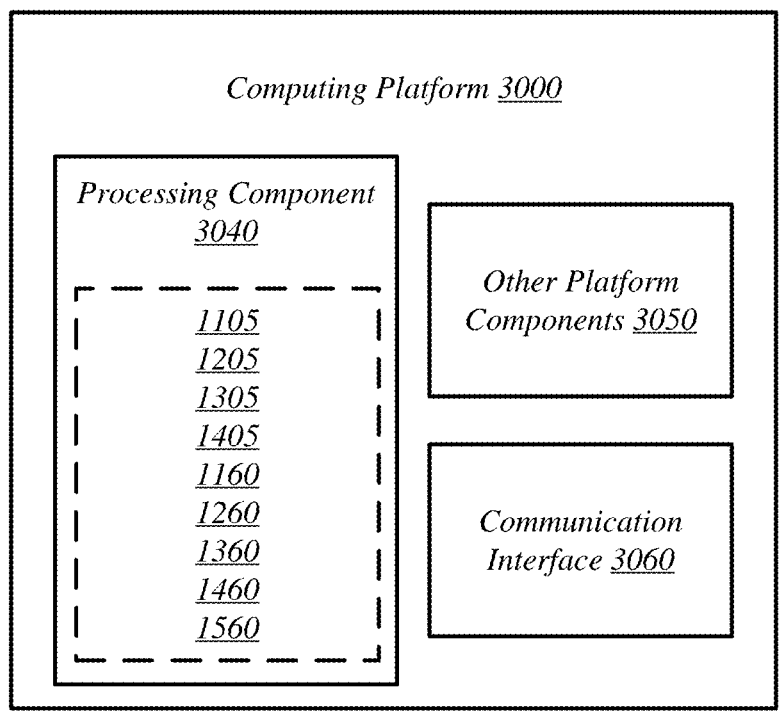
FIG. 16 illustrates an example computing platform.

FIG. 16 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may include hardware or logic for apparatus described herein, such as, physical accelerator resources (e.g., 1105, 1205, 1305, 1405, 1505, or the like) or accelerator memory (e.g., 1160, 1260, 1360, 1460, 1560 or the like). Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A system for a data center comprising: a rack comprising a plurality of sled spaces; and at least one physical accelerator resource sled coupled to the rack via a one of the plurality of sled spaces, the sled comprising: a plurality of physical accelerator resources; a bank or physical memory; and a memory controller to couple the bank of physical memory to each of the plurality of physical accelerator resources to provide each of the plurality of physical accelerator resources access to the bank of physical memory.

Example 2

The system of example 1, the plurality of physical accelerator resources comprising field-programmable gate array (FPGA) packages.

Example 3

The system of example 2, the plurality of physical accelerator resources comprising a first FPGA package and a second FPGA package, the first and the second FPGA packages to couple to the bank of physical memory through the memory controller.

Example 4

The system of example 2, the plurality of physical accelerator resources comprising a first FPGA package and a second FPGA package and the memory controller comprising a first memory controller and a second memory controller, the first FPGA package to couple to the bank of physical memory through the first memory controller and the second FPGA package to couple to the bank of physical memory through the second memory controller.

Example 5

The system of example 4, the bank of physical memory comprising at least a first group of physical memory and a second group of physical memory, the first FPGA package to couple to the first group of physical memory through the first memory controller and the second FPGA package to couple to the second group of physical memory through the second memory controller.

Example 6

The system of example 5, comprising an out-of-band (OOB) channel coupled to the first FPGA package and the second FPGA package, the first and the second FPGA packages to access the first or the second groups of physical memory via the OOB channel.

Example 7

The system of example 4, the first memory controller integrated into the first FPGA package and the second memory controller integrated into the second FPGA package.

Example 8

The system of any one of examples 1 to 7, the sled comprising a first surface and a second surface different than the first surface, the plurality of accelerator resources disposed on the first surface and the bank of physical memory disposed on a second surface.

Example 9

The system of example 8, the first surface and the second surface opposite from each other.

Example 10

The system of any one of examples 1 to 7, the bank of physical memory comprising a plurality of memory dual in-line memory modules.

Example 11

The system of any one of example 1 to 7, the bank of physical memory comprising a combination of dynamic random access memory and three-dimensional (3D) crosspoint memory.

Example 12

An apparatus for a physical accelerator resource sled, comprising: a plurality of physical accelerator resources; a bank or physical memory; and a memory controller to couple the bank of physical memory to each of the plurality of physical accelerator resources to provide each of the plurality of physical accelerator resources access to the bank of physical memory.

Example 13

The apparatus of example 12, the plurality of physical accelerator resources comprising field-programmable gate array (FPGA) packages.

Example 14

The apparatus of example 13, the plurality of physical accelerator resources comprising a first FPGA package and a second FPGA package, the first and the second FPGA packages to couple to the bank of physical memory through the memory controller.

Example 15

The apparatus of example 13, the plurality of physical accelerator resources comprising a first FPGA package and a second FPGA package and the memory controller comprising a first memory controller and a second memory controller, the first FPGA package to couple to the bank of physical memory through the first memory controller and the second FPGA package to couple to the bank of physical memory through the second memory controller.

Example 16

The apparatus of example 15, the bank of physical memory comprising at least a first group of physical memory and a second group of physical memory, the first FPGA package to couple to the first group of physical memory through the first memory controller and the second FPGA package to couple to the second group of physical memory through the second memory controller.

Example 17

The apparatus of example 16, comprising an out-of-band (OOB) channel coupled to the first FPGA package and the second FPGA package, the first and the second FPGA packages to access the first or the second groups of physical memory via the OOB channel.

Example 18

The apparatus of example 15, the first memory controller integrated into the first FPGA package and the second memory controller integrated into the second FPGA package.

Example 19

The apparatus of any one of example 12 to 18, comprising a frame mountable within a sled space of a rack of a data center, the plurality of physical accelerator resources, the bank or physical memory, and the memory controller mounted to the frame.

Example 20

The apparatus of example 19, the plurality of accelerator resources mounted to the frame in a first surface and the bank of physical memory mounted to the frame in a second surface different than the first surface.

Example 21

The apparatus of example 20, the first surface and the second surface opposite from each other.

Example 22

The apparatus of any one of examples 12 to 18, the bank of physical memory comprising a plurality of memory dual in-line memory modules.

Example 23

The apparatus of any one of example 12 to 18, the bank of physical memory comprising a combination of dynamic random access memory and three-dimensional (3D) cross-point memory.

Example 24

An apparatus for a physical resource sled in a data center, comprising: a frame mountable within a sled space of a rack of a data center; a plurality of physical accelerator resources coupled to the frame; a plurality of sockets to receive physical memory modules; and a memory controller to couple the physical memory modules to each of the plurality of physical accelerator resources to provide each of the plurality of physical accelerator resources memory access.

Example 25

The apparatus of example 24, the plurality of physical accelerator resources comprising field-programmable gate array (FPGA) packages.

Example 26

The apparatus of example 25, the plurality of physical accelerator resources comprising a first FPGA package and a second FPGA package, the first and the second FPGA packages to couple to the physical memory modules through the memory controller.

Example 27

The apparatus of example 25, the plurality of physical accelerator resources comprising a first FPGA package and a second FPGA package and the memory controller comprising a first memory controller and a second memory controller, the first FPGA package to couple to the physical memory modules through the first memory controller and the second FPGA package to couple to the physical memory modules through the second memory controller.

Example 28

The apparatus of example 27, the plurality of sockets comprising at least a first group of sockets and a second group of sockets, the first FPGA package to couple to a first group of physical memory modules coupled to the first group of sockets through the first memory controller and the second FPGA package to couple to a second group of physical memory modules coupled to the second group of sockets through the second memory controller.

Example 29

The apparatus of example 28, comprising an out-of-band (OOB) channel coupled to the first FPGA package and the second FPGA package, the first and the second FPGA packages to access the first or the second groups of physical memory modules via the OOB channel.

Example 30

The apparatus of example 27, the first memory controller integrated into the first FPGA package and the second memory controller integrated into the second FPGA package.

Example 31

The apparatus of any one of examples 24 to 30, the plurality of accelerator resources mounted to the frame in a first surface and the plurality of sockets mounted to the frame in a second surface different than the first surface.

Example 32

The apparatus of example 31, the first surface and the second surface opposite from each other.

Example 33

The apparatus of any one of examples 24 to 30, the plurality of sockets arranged to receive dual in-line memory modules.

Example 34

The apparatus of any one of examples 24 to 30, the plurality of sockets arranged to receive a combination of dynamic random access memory and three-dimensional (3D) cross-point memory.

Example 35

A method for one or more memory controllers, comprising: detecting, at one or more memory controllers, a plurality of physical memory modules coupled to a plurality of sockets, the plurality of sockets coupled to a plurality of physical accelerator resources; and
coupling the physical memory modules to each of the plurality of physical accelerator resources to provide each of the plurality of physical accelerator resources memory access.

Example 36

The method of example 35, the plurality of sockets disposed on a frame mountable within a sled space of a rack of a data center.

Example 37

The method of example 36, the plurality of physical accelerator resources coupled to the frame.

Example 38

The method of example 35, the plurality of physical accelerator resources comprising field-programmable gate array (FPGA) packages.

Example 39

The method of claim 35, the plurality of physical accelerator resources comprising a first FPGA package and a second FPGA package, the method comprising coupling, via the one or more memory controllers, the first and the second FPGA packages to the physical memory modules.

Example 40

The method of example 35, the plurality of physical accelerator resources comprising a first FPGA package and a second FPGA package, the method comprising:
coupling, via a first memory controller of the one or more memory controllers, the first FPGA package to the physical memory modules; and coupling, via a second memory controller of the one or more memory controllers, the second FPGA package to the physical memory modules.

Example 41

The method of example 40, the plurality of sockets comprising at least a first group of sockets and a second group of sockets, the method comprising: coupling, via the first group of sockets, the first FPGA package to a first group physical memory modules disposed in the first group of sockets; and coupling, via the second group of sockets, the second FPGA package to a second group physical memory modules disposed in the second group of sockets.

Example 42

The method of example 41, comprising accessing, via an out-of-band (OOB) channel, the second group of physical memory modules by the first FPGA package or accessing via the OOB channel, the first group of physical memory modules by the second FPGA package.

Example 43

The method of example 40, the first memory controller integrated into the first FPGA package and the second memory controller integrated into the second FPGA package.

Example 44

The method of example 37, the plurality of accelerator resources mounted to the frame in a first surface and the plurality of sockets mounted to the frame in a second surface different than the first surface.

Example 45

The method of example 44, the first surface and the second surface opposite from each other.

Example 46

The method of any one of example 35 to 45, the plurality of sockets arranged to receive dual in-line memory modules.

Example 47

The method of any one of examples 35 to 45, the plurality of sockets arranged to receive a combination of dynamic random access memory and three-dimensional (3D) cross-point memory.

The invention claimed is:
1. A system for a data center comprising:
a rack comprising a plurality of sled spaces; and
at least one physical accelerator resource sled coupled to the rack via a one of the plurality of sled spaces, the sled comprising:
a plurality of physical accelerator resources;
a bank of physical memory; and
one or more memory controllers to couple the bank of physical memory to each of the plurality of physical accelerator resources to provide each of the plurality of physical accelerator resources access to the bank of physical memory;
the at least one physical accelerator resource sled comprising a first surface and a second surface different than the first surface, the plurality of physical accelerator resources disposed on the first surface and the bank of physical memory disposed on a second surface, the first surface and the second surface opposite from each other;
the bank of physical memory having more than one groups of physical memory, the plurality of physical accelerator resources coupled with the more than one groups of physical memory via out-of-band (OOB)

channels; the plurality of physical accelerator resources to access the more than one groups of physical memory via either direct attachment through the one or more memory controllers or via the OOB channels.

2. The system of claim 1, the plurality of physical accelerator resources comprising field-programmable gate array (FPGA) packages.

3. The system of claim 2, the plurality of physical accelerator resources comprising a first FPGA package and a second FPGA package, the first and the second FPGA packages to couple to the bank of physical memory through the one or more memory controllers.

4. The system of claim 2, the plurality of physical accelerator resources comprising a first FPGA package and a second FPGA package and the one or more memory controllers comprising a first memory controller and a second memory controller, the first FPGA package to couple to the bank of physical memory through the first memory controller and the second FPGA package to couple to the bank of physical memory through the second memory controller.

5. The system of claim 4, the bank of physical memory comprising at least a first group of the more than one groups of physical memory and a second group of the more than one groups of physical memory, the first FPGA package to couple to the first group of physical memory through the first memory controller and the second FPGA package to couple to the second group of physical memory through the second memory controller.

6. The system of claim 5, comprising one of the OOB channels coupled to the first FPGA package and the second FPGA package, the first and the second FPGA packages to access the first or the second groups of physical memory via the one of the OOB channels.

7. The system of claim 4, the first memory controller integrated into the first FPGA package and the second memory controller integrated into the second FPGA package.

8. The system of claim 1, the bank of physical memory comprising a plurality of memory dual in-line memory modules.

9. The system of claim 1, the bank of physical memory comprising a combination of dynamic random access memory and three-dimensional (3D) cross-point memory.

10. An apparatus for a sled, comprising:
a plurality of physical accelerator resources;
a bank of physical memory;
one or more memory controllers to couple the bank of physical memory to each of the plurality of physical accelerator resources to provide each of the plurality of physical accelerator resources access to the bank of physical memory; and
a frame, the plurality of physical accelerator resources mounted to the frame in a first surface and the bank of physical memory mounted to the frame in a second surface, the first surface opposite from the second surface;
the bank of physical memory having more than one groups of physical memory, the plurality of physical accelerator resources coupled with the more than one groups of physical memory via out-of-band (OOB) channels; the plurality of physical accelerator resources to access the more than one groups of physical memory via either direct attachment through the one or more memory controllers or via the OOB channels.

11. The apparatus of claim 10, the plurality of physical accelerator resources comprising field-programmable gate array (FPGA) packages.

12. The apparatus of claim 11, the plurality of physical accelerator resources comprising a first FPGA package and a second FPGA package, the first and the second FPGA packages to couple to the bank of physical memory through the one or more memory controllers.

13. The apparatus of claim 11, the plurality of physical accelerator resources comprising a first FPGA package and a second FPGA package and the one or more memory controllers comprising a first memory controller and a second memory controller, the first FPGA package to couple to the bank of physical memory through the first memory controller and the second FPGA package to couple to the bank of physical memory through the second memory controller.

14. The apparatus of claim 13, the bank of physical memory comprising at least a first group of the more than one groups of physical memory and a second group of the more than one groups of physical memory, the first FPGA package to couple to the first group of physical memory through the first memory controller and the second FPGA package to couple to the second group of physical memory through the second memory controller, the apparatus comprising one of the OOB channels coupled to the first FPGA package and the second FPGA package, the first and the second FPGA packages to access the first or the second groups of physical memory via the one of the OOB channels.

15. The apparatus of claim 13, the first memory controller integrated into the first FPGA package and the second memory controller integrated into the second FPGA package.

16. The apparatus of claim 10, comprising the frame mountable within a sled space of a rack of a data center, the plurality of physical accelerator resources, the bank of physical memory, and the one or more memory controllers mounted to the frame.

17. The apparatus of claim 10, the bank of physical memory comprising a combination of dynamic random access memory and three-dimensional (3D) cross-point memory.

18. An apparatus comprising:
a frame mountable within a sled space of a rack of a data center;
a plurality of physical accelerator resources coupled to the frame; and
a plurality of sockets to receive physical memory modules;
the plurality of physical accelerator resources mounted to the frame in a first surface and the plurality of sockets mounted to the frame in a second surface, the first surface opposite from the second surface;
the physical memory modules to comprise more than one groups of physical memory, the plurality of physical accelerator resources coupled with the plurality of sockets to couple with the more than one groups of physical memory via out-of-band (OOB) channels; the plurality of physical accelerator resources to access the more than one groups of physical memory via either direct attachment through one or more memory controllers or via the OOB channels.

19. The apparatus of claim 18, the plurality of physical accelerator resources comprising a first field-programmable gate array (FPGA) package and a second FPGA package and the one or more memory controllers comprising a first memory controller and a second memory controller, the first FPGA package to couple to the physical memory modules through the first memory controller and the second FPGA package to couple to the physical memory modules through the second memory controller.

20. The apparatus of claim 19, the plurality of sockets comprising at least a first group of sockets and a second group of sockets, the first FPGA package to couple to a first group of the more than one groups of physical memory modules coupled to the first group of sockets through the first memory controller and the second FPGA package to couple to a second group of the more than one groups of physical memory modules coupled to the second group of sockets through the second memory controller.

21. The apparatus of claim 18, the plurality of sockets arranged to receive a combination of dynamic random access memory and three-dimensional (3D) cross-point memory.

22. The apparatus of claim 18, the plurality of physical accelerator resources comprising field-programmable gate array (FPGA) packages.

23. The apparatus of claim 22, wherein the FPGA packages comprise the one or more memory controllers to couple the physical memory modules to each of the plurality of physical accelerator resources to provide each of the plurality of physical accelerator resources memory access.

24. The apparatus of claim 22, further comprising the one or more memory controllers coupled with the plurality of physical accelerator resources to couple the physical memory modules to each of the plurality of physical accelerator resources to provide each of the plurality of physical accelerator resources memory access.

* * * * *